(12) United States Patent
Abe et al.

(10) Patent No.: US 8,159,745 B2
(45) Date of Patent: Apr. 17, 2012

(54) PORTABLE SCREEN ASSEMBLY AND EXPANDING AND CONTRACTING COLUMN AND HANDING TOOL USED THEREFOR

(75) Inventors: Teruyuki Abe, Tokyo (JP); Kazuharu Seki, Tokyo (JP)

(73) Assignee: Izumi-Cosmo Company, Limited, Osaka (JP)

( * ) Notice: Subject to any disclaimer, the term of this patent is extended or adjusted under 35 U.S.C. 154(b) by 0 days.

(21) Appl. No.: 12/936,802

(22) PCT Filed: Apr. 24, 2009

(86) PCT No.: PCT/JP2009/058123
§ 371 (c)(1),
(2), (4) Date: Oct. 7, 2010

(87) PCT Pub. No.: WO2009/133808
PCT Pub. Date: Nov. 5, 2009

(65) Prior Publication Data
US 2011/0032612 A1 Feb. 10, 2011

(30) Foreign Application Priority Data

May 2, 2008 (JP) ............................. P 2008-120217
Feb. 9, 2009 (CN) ...................... 2009 2 0000370 U

(51) Int. Cl.
*G03B 21/58* (2006.01)
(52) U.S. Cl. ........................................ 359/461; 359/443
(58) Field of Classification Search .................. 359/461; 248/919, 200–500; 70/57–62; 40/120; 33/200–600; 74/493; 160/23.1–24
See application file for complete search history.

(56) References Cited

U.S. PATENT DOCUMENTS

| 2,845,244 | A | * | 7/1958 | Prokop | .......................... 248/171 |
| 3,182,714 | A | | 5/1965 | Petrick | |
| 3,225,818 | A | * | 12/1965 | Wise | ................................ 160/24 |
| 3,245,644 | A | * | 4/1966 | Kozel | ............................ 248/171 |

(Continued)

FOREIGN PATENT DOCUMENTS

EP    1 684 114    7/2006

(Continued)

OTHER PUBLICATIONS

European Search Report (in English language) issued Apr. 13, 2011 in corresponding European Patent Application No. 09738745.

(Continued)

*Primary Examiner* — Clayton E Laballe
*Assistant Examiner* — Kevin Butler
(74) *Attorney, Agent, or Firm* — Wenderoth, Lind & Ponack, L.L.P.

(57) ABSTRACT

A portable screen assembly is small, light and easy to handle and enables easy extension and contraction of a column stretching a screen. The column has at least a first cylindrical body, a second cylindrical body, and a third cylindrical body, wherein the first cylindrical body slides within the second cylindrical body and the second cylindrical body slides within the third cylindrical body. The column also includes a first lock portion locking slide of the first cylindrical body, a second lock portion locking slide of the second cylindrical body, a lock release lever provided at an upper end portion of the first cylindrical body, and a release bar having an upper end portion pivotally connected to the lock release lever so as to be movable vertically within the first cylindrical body.

11 Claims, 12 Drawing Sheets

U.S. PATENT DOCUMENTS

| | | | | |
|---|---|---|---|---|
| 3,314,467 | A | * | 4/1967 | Jacobson ............... 160/24 |
| 3,324,928 | A | * | 6/1967 | Muller ................. 160/24 |
| 3,629,910 | A | * | 12/1971 | Kirberg et al. .......... 24/613 |
| 5,267,480 | A | * | 12/1993 | Krizan ................. 74/493 |
| 5,897,268 | A | * | 4/1999 | Deville ............... 403/109.5 |
| 6,343,404 | B1 | * | 2/2002 | Kuo ................... 16/113.1 |
| 7,967,261 | B2 | * | 6/2011 | Wilcox ................ 248/188.5 |
| 2005/0028943 | A1 | | 2/2005 | Chang |
| 2007/0002440 | A1 | * | 1/2007 | Miyagawa et al. ......... 359/461 |
| 2008/0094699 | A1 | * | 4/2008 | Miyagawa et al. ......... 359/461 |
| 2008/0239481 | A1 | | 10/2008 | Miyagawa et al. |
| 2008/0247041 | A1 | | 10/2008 | Miyagawa et al. |
| 2010/0168747 | A1 | * | 7/2010 | Lynch et al. ............ 606/79 |
| 2011/0026114 | A1 | * | 2/2011 | Abe et al. .............. 359/461 |

FOREIGN PATENT DOCUMENTS

| | | |
|---|---|---|
| JP | 6-36048 | 5/1994 |
| JP | 2006-72291 | 3/2006 |
| WO | 2005/043235 | 5/2005 |

OTHER PUBLICATIONS

International Search Report issued Jun. 23, 2009 in International (PCT) Application No. PCT/JP2009/058123.

Chinese Office Action (together with English translation) issued Jul. 29, 2011 in corresponding Chinese Application No. 200980115565.1.

European Office Action issued on Sep. 27, 2011 in corresponding European Patent Application No. 09 738 745.0.

* cited by examiner

PORTABLE SCREEN ASSEMBLY AND EXPANDING AND CONTRACTING COLUMN AND HANDING TOOL USED THEREFOR

BACKGROUND OF THE INVENTION

1. Field of the Invention

The present invention relates to a screen on which a display image by a projection assembly such as a projector is enlarged and projected, and more specifically relates to a portable screen assembly that is easy to carry and can be installed at an arbitrary location such as a floor or a table, and an expanding and contracting column, and a handling tool used therefor.

2. Description of the Related Art

An image from a projector is generally enlarged, projected and displayed on a reflective screen. Of such screens, some are generally accommodated in a housing mounted on a ceiling or a side wall, and are electrically or manually extended as occasion demands. Hanging screens or screens with a tripod are used by hanging or locating them at a desired place.

Recently, along with an increase of meetings in companies or offices, there is an increasing demand for a simply-structured portable screen assembly that can be carried easily with a projector and that can be installed on a floor, a meeting desk or a table in a meeting room to project an image from the projector. Under such circumstances, a portable screen in which a screen wound around a spring-biased roll is stored in a storage case is proposed. As such a portable screen assembly, there are proposed a type that installs a storage case at an arbitrary location and pulls up a screen with use of an elastic force of a spring or the like by a pantograph, and a type that engages a screen to a foldable column attached to a storage case (e.g., JP-U No. H06-36048).

On the other hand, along with the popularization of a projector for projection of television images in homes, there is an increasing demand for a household portable screen assembly.

BRIEF SUMMARY OF THE INVENTION

A household portable screen assembly is required to be smaller, lighter and easier to handle so that even females and children can carry the assembly. Moreover, a column is required to enable easy extension and contraction. There is a recent trend toward increase in screen size such as a 100-inch screen. However, in the case of such a large-sized screen, it is difficult to extend and contract the column directly by hand. For this reason, a handling tool that enables a person to extend and contract the column from a distance is also required.

The present invention has been made to meet the foregoing demands and to solve the foregoing problems, and an object of the present invention is to provide a portable screen assembly that is small, light and easy to handle and enables easy extension and contraction of a column, and an expanding and contracting column, and a handling tool used therefor.

To solve the above problems, a portable screen assembly according to a first aspect of the present invention includes a casing having an opening extending in a longitudinal direction, a spring-biased roll rotatably mounted to the casing, a screen wound around the spring-biased roll when in storage and pulled out from the opening when in use, a top bar secured to one end of the screen and used also as a cover to close the opening when in storage, and an expandable column having one end supported at the casing and holding the pulled out screen in a stretched state, wherein the assembly uses as the column an expanding and contracting column having at least a first cylindrical body, a second cylindrical body, and a third cylindrical body, wherein the first cylindrical body slides within the second cylindrical body, the second cylindrical body slides within the third cylindrical body, and the cylindrical bodies are located in an order of the first cylindrical body, the second cylindrical body, and the third cylindrical body from an upper stage side in an extended state, and the expanding and contracting column has a first lock portion locking slide of the first cylindrical body, a second lock portion locking slide of the second cylindrical body, a lock release lever provided at an upper end portion of the first cylindrical body, a release bar having an upper end portion rotatably supported to the lock release lever so as to be movable vertically within the first cylindrical body, a first lock release portion provided at a lower end portion of the release bar and releasing the first lock portion, and a second lock release portion provided further below the first lock release portion at the lower end portion of the release bar and releasing the second lock portion.

Here, the first lock portion is preferably provided at a lower end portion of the first cylindrical body and thrusts an inner wall of the second cylindrical body to lock the slide of the first cylindrical body by a friction force with the inner wall, the second lock portion is preferably provided at a lower end portion of the second cylindrical body and thrusts an inner wall of the third cylindrical body to lock the slide of the second cylindrical body by a friction force with the inner wall, the first lock release portion preferably releases the first lock portion by releasing the thrust of the first lock portion toward the inner wall of the second cylindrical body, and the second lock release portion preferably releases the second lock portion by releasing the thrust of the second lock portion toward the inner wall of the third cylindrical body.

Moreover, the first lock portion preferably has a slide member fixed at a part thereof to the lower end portion of the first cylindrical body and having, at least at a part of circumference thereof, a taper surface tilting toward an inner wall of an adjacent outer cylindrical body, a stopper held between the taper surface and a cylindrical body on a lower stage than each of the cylindrical bodies, and an elastic member biasing the stopper so that the stopper abuts on the taper surface, and the second lock portion preferably has a slide member fixed at a part thereof to the lower end portion of the second cylindrical body and having, at least at a part of circumference thereof, a taper surface tilting toward an inner wall of an adjacent outer cylindrical body, a stopper held between the taper surface and a cylindrical body on a lower stage than each of the cylindrical bodies, and an elastic member biasing the stopper so that the stopper abuts on the taper surface.

Moreover, the stopper preferably has a tilted surface to abut on the taper surface.

Moreover, the first lock portion preferably has a first catching portion constituted by a plurality of through holes provided in a longitudinal direction of the second cylindrical body, and a first engaging portion provided at the lower end portion of the first cylindrical body and engageable with the first catching portion, the second lock portion preferably has a second catching portion constituted by a plurality of through holes provided in a longitudinal direction of the third cylindrical body and a second engaging portion provided at the lower end portion of the second cylindrical body and engageable with the second catching portion, and a first lock release portion that releases engagement of the first engaging portion with the first catching portion is preferably provided at the lower end portion of the release bar, and a second lock release portion that releases engagement of the second engaging portion with the second catching portion is preferably provided under the first lock release portion.

Moreover, a handle portion is preferably provided at a center portion of the top bar while a hook portion is preferably provided at a tip end portion of the column, and the handle portion is preferably hooked to the hook portion.

Moreover, at the hook portion, there is preferably provided the lock release lever that is connected to the release bar having a handling portion located on a front surface side of the hook portion, and the release bar preferably moves upward, in conjunction with a thrust operation to the handling portion of the lock release lever.

Moreover, the column is preferably rotatably supported to a center portion on a side surface of the casing so that one end can be erected and holds the pulled out screen in a stretched state when erected.

Moreover, the assembly preferably includes a lock mechanism that locks the top bar to the casing in storage.

Moreover, the lock mechanism preferably has an engaging portion provided on the top bar and a portion to be engaged provided at the casing and engaged with the engaging portion.

Moreover, the engaging portion preferably has a pair of engaging members provided to be opposed in a width direction of the top bar while the portion to be engaged preferably has a pair of members to be engaged respectively provided at opposed opening edge portions of the casing and engaged with the engaging members.

A portable screen assembly according to a second aspect of the present invention includes a casing having an opening extending in a longitudinal direction, a spring-biased roll rotatably mounted to the casing, a screen wound around the spring-biased roll when in storage and pulled out from the opening when in use, a top bar secured to one end of the screen and used also as a cover to close the opening when in storage, and an expandable column having one end supported at the casing and holding the pulled out screen in a stretched state, wherein the column is an expanding and contracting column including plural-stage cylindrical bodies that are located in an order of at least a first cylindrical body and a second cylindrical body from an upper stage side in an extended state, wherein the expanding and contracting column includes a first lock portion locking slide of the first cylindrical body, a lock release lever provided at an upper end portion of the first cylindrical body, a release bar having an upper end portion rotatably supported to the lock release lever so as to be movable vertically within the first cylindrical body, and a first lock release portion provided at a lower end portion of the release bar and releasing the first lock portion, and the first lock release portion releases the first lock portion, in conjunction with upward movement of the release bar.

Here, the first lock portion preferably has a slide member fixed at a part thereof to the lower end portion of the first cylindrical body and having, at least at a part of circumference thereof, a taper surface tilting toward an inner wall of an adjacent outer cylindrical body, a stopper held between the taper surface and a cylindrical body on a lower stage than each of the cylindrical bodies, and an elastic member biasing the stopper so that the stopper abuts on the taper surface.

Moreover, the first lock release portion preferably has a swing member having one end rotatably supported to the lower end portion of the release bar and the other end swinging in conjunction with upward movement of the release bar so as to release the thrust of the first lock portion to an inner wall of the second cylindrical body. The swing member preferably thrusts the stopper to release abutment of the stopper on the taper surface.

Moreover, a handle portion is preferably provided at a center portion of the top bar while a hook portion is preferably provided at a tip end portion of the column, and the handle portion is preferably hooked to the hook portion.

Moreover, at the hook portion, there is preferably provided the lock release lever that is connected to the release bar having a handling portion located on a front side of the hook portion, and the release bar preferably moves upward, in conjunction with a thrust operation to the handling portion of the lock release lever.

Moreover, the column is preferably rotatably supported to a center portion on a side surface of the casing so that one end can be erected and holds the pulled out screen in a stretched state when erected.

Moreover, the assembly preferably includes a lock mechanism that locks the top bar to the casing in storage.

Moreover, the lock mechanism preferably has an engaging portion provided on the top bar and a portion to be engaged provided at the casing and engaged with the engaging portion.

Moreover, the engaging portion preferably has a pair of engaging members provided to be opposed in a width direction of the top bar while the portion to be engaged preferably has a pair of members to be engaged respectively provided at opposed opening edge portions of the casing and engaged with the engaging members.

A portable screen assembly according to a third aspect of the present invention includes a casing having an opening extending in a longitudinal direction, a spring-biased roll rotatably mounted to the casing, a screen wound around the spring-biased roll when in storage and pulled out from the opening when in use, a top bar secured to one end of the screen and used also as a cover to close the opening when in storage, and an expandable column having one end supported at the casing and holding the pulled out screen in a stretched state, wherein the column is an expanding and contracting column including plural-stage cylindrical bodies, provided at the lower end portions of inner cylindrical bodies with one or more lock portions locking mutual slide of the cylindrical bodies by a friction force with an adjacent outer cylindrical body, and arranging one or more lock release portions to be vertically movable within the cylindrical bodies, the one or more lock release portions corresponding to the lock portions and released by a lock release lever provided at the upper end portion of the uppermost cylindrical body.

Here, the column preferably has a release bar having an upper end portion rotatably supported to the lock release lever so as to be movable vertically within the cylindrical bodies, and preferably has lock release portions at a lower end portion of the release bar.

Moreover, each lock portion preferably has a slide member fixed at a part thereof to a lower end portion of each of the cylindrical bodies other than the lowermost cylindrical body and having, at least at a part of circumference thereof, a taper surface tilting toward an inner wall of an adjacent outer cylindrical body, a stopper held between the taper surface and a cylindrical body on a lower stage than each of the cylindrical bodies, and an elastic member biasing the stopper so that the stopper abuts on the taper surface.

Moreover, each lock release portion preferably has a swing member having one end rotatably supported to the lower end portion of the release bar and the other end swinging in conjunction with upward movement of the release bar so as to release the thrust of each lock portion to an inner wall of an outer cylindrical body.

Moreover, the swing member preferably thrusts the stopper to release abutment of the stopper on the taper surface.

Moreover, the stopper preferably has a tilted surface to abut on the taper surface.

Moreover, a handle portion is preferably provided at a center portion of the top bar while a hook portion is preferably provided at a tip end portion of the column, and the handle portion is preferably hooked to the hook portion.

Moreover, at the hook portion, there is preferably provided the lock release lever that is connected to the release bar having a handling portion located on a front surface side of the hook portion, and the release bar preferably moves upward, in conjunction with a thrust operation to the handling portion of the lock release lever.

Moreover, the column is preferably rotatably supported to a center portion on a side surface of the casing so that one end can be erected and holds the pulled out screen in a stretched state when erected.

Moreover, the assembly preferably includes a lock mechanism that locks the top bar to the casing in storage.

Moreover, the lock mechanism preferably has an engaging portion provided on the top bar and a portion to be engaged provided at the casing and engaged with the engaging portion.

Moreover, the engaging portion preferably has a pair of engaging members provided to be opposed in a width direction of the top bar while the portion to be engaged preferably has a pair of members to be engaged respectively provided at opposed opening edge portions of the casing and engaged with the engaging members.

A portable screen assembly according to a fourth aspect of the present invention includes a casing having an opening extending in a longitudinal direction, a spring-biased roll rotatably mounted to the casing, a screen wound around the spring-biased roll when in storage and pulled out from the opening when in use, a top bar secured to one end of the screen and used also as a cover to close the opening when in storage, and an expandable column having one end supported at the casing and holding the pulled out screen in a stretched state, wherein the column including plural-stage cylindrical bodies, is provided at a lower end portion of each of the cylindrical bodies other than the uppermost cylindrical body with a lock portion locking mutual slide of the cylindrical bodies, and is provided at the upper end portion of the column with a lock release portion to release the lock portion, and the upper end portion of the column is located above the top bar when the screen is stretched.

Here, the column preferably has a release bar having an upper end portion rotatably supported to the lock release lever so as to be movable vertically within the cylindrical bodies and preferably has lock release portions at the lower end portion of the release bar.

Moreover, the lock portion preferably has a slide member fixed at a part thereof to the lower end portion of each of the cylindrical bodies other than the lowermost cylindrical body and having, at least at a part of circumference thereof, a taper surface tilting toward an inner wall of an adjacent outer cylindrical body, a stopper held between the taper surface and a cylindrical body on a lower stage than each of the cylindrical bodies, and an elastic member biasing the stopper so that the stopper abuts on the taper surface.

Moreover, each lock release portion preferably has a swing member having one end rotatably supported to the lower end portion of the release bar and the other end swinging in conjunction with upward movement of the release bar so as to release the thrust of each lock portion to an inner wall of an outer cylindrical body.

Moreover, the swing member preferably thrusts the stopper to release abutment of the stopper on the taper surface.

Moreover, the stopper preferably has a tilted surface to abut on the taper surface.

Moreover, a handle portion is preferably provided at a center portion of the top bar while a hook portion is preferably provided at a tip end portion of the column, and the handle portion is preferably hooked to the hook portion.

Moreover, at the hook portion, there is preferably provided the lock release lever so as to be located on a front side of the hook portion.

Moreover, the column is preferably rotatably supported to a center portion on a side surface of the casing so that one end can be erected and holds the pulled out screen in a stretched state when erected.

Moreover, the assembly preferably includes a lock mechanism that locks the top bar to the casing in storage.

Moreover, the lock mechanism preferably has an engaging portion provided on the top bar and a portion to be engaged provided at the casing and engaged with the engaging portion.

Moreover, the engaging portion preferably has a pair of engaging members provided to be opposed in a width direction of the top bar while the portion to be engaged preferably has a pair of members to be engaged respectively provided at opposed opening edge portions of the casing and engaged with the engaging members.

An expanding and contracting column according to a first aspect of the present invention is an expanding and contracting column having at least a first cylindrical body, a second cylindrical body, and a third cylindrical body, wherein the first cylindrical body slides within the second cylindrical body, the second cylindrical body slides within the third cylindrical body, and the cylindrical bodies are located in an order of the first cylindrical body, the second cylindrical body, and the third cylindrical body from an upper stage side in an extended state, and the expanding and contracting column includes a first lock portion locking slide of the first cylindrical body, a second lock portion locking slide of the second cylindrical body, a lock release lever provided at an upper end portion of the first cylindrical body, a release bar having an upper end portion rotatably supported to the lock release lever so as to be movable vertically within the first cylindrical body, a first lock release portion provided at a lower end portion of the release bar and releasing the first lock portion, and a second lock release portion provided further below the first lock release portion at the lower end portion of the release bar and releasing the second lock portion.

Here, the first lock portion is preferably provided at a lower end portion of the first cylindrical body and thrusts an inner wall of the second cylindrical body to lock the slide of the first cylindrical body by a friction force with the inner wall, the second lock portion is preferably provided at a lower end portion of the second cylindrical body and thrusts an inner wall of the third cylindrical body to lock the slide of the second cylindrical body by a friction force with the inner wall, the first lock release portion preferably releases the first lock portion by releasing the thrust of the first lock portion toward the inner wall of the second cylindrical body, and the second lock release portion preferably releases the second lock portion by releasing the thrust of the second lock portion toward the inner wall of the third cylindrical body.

Moreover, the first lock portion preferably has a slide member fixed at a part thereof to the lower end portion of the first cylindrical body and having, at least at a part of circumference thereof, a taper surface tilting toward an inner wall of an adjacent outer cylindrical body, a stopper held between the taper surface and a cylindrical body on a lower stage than each of the cylindrical bodies, and an elastic member biasing the stopper so that the stopper abuts on the taper surface, and the second lock portion preferably has a slide member fixed at a part thereof to the lower end portion of the second cylindrical body and having, at least at a part of circumference thereof, a taper surface tilting toward an inner wall of an adjacent outer cylindrical body, a stopper held between the taper surface and a cylindrical body on a lower stage than each of the cylindrical bodies, and an elastic member biasing the stopper so that the stopper abuts on the taper surface.

Moreover, the stopper preferably has a tilted surface to abut on the taper surface.

Moreover, the first lock portion preferably has a first catching portion constituted by a plurality of through holes provided in a longitudinal direction of the second cylindrical body, and a first engaging portion provided at the lower end portion of the first cylindrical body and engageable with the first catching portion, the second lock portion preferably has a second catching portion constituted by a plurality of through holes provided in a longitudinal direction of the third cylindrical body and a second engaging portion provided at the lower end portion of the second cylindrical body and engageable with the second catching portion, and a first lock release portion that releases engagement of the first catching portion with the first engaging portion is preferably provided at the lower end portion of the release bar, and a second lock release portion that releases engagement of the second catching portion with the second engaging portion is preferably provided under the first lock release portion.

Moreover, the column preferably includes four or more cylindrical bodies, wherein, in each of the cylindrical bodies on a lower stage than the third cylindrical body, a lock portion is preferably provided at the lower end portion of a cylindrical body on a higher stage while a lock release portion corresponding to the lock portion is preferably provided at the release bar.

An expanding and contracting column according to a second aspect of the present invention is an expanding and contracting column including plural-stage cylindrical bodies that are located in an order of at least a first cylindrical body and a second cylindrical body from an upper stage side in an extended state, wherein the expanding and contracting column has a first lock portion locking slide of the first cylindrical body, a lock release lever provided at an upper end portion of the first cylindrical body, a release bar having an upper end portion rotatably supported to the lock release lever so as to be movable vertically within the first cylindrical body, and a first lock release portion provided at the lower end portion of the release bar and releasing the first lock portion, and wherein the first lock release portion releases the first lock portion, in conjunction with upward movement of the release bar.

Here, the first lock portion preferably has a slide member fixed at a part thereof to the lower end portion of the first cylindrical body and having, at least at a part of circumference thereof, a taper surface tilting toward an inner wall of an adjacent outer cylindrical body, a stopper held between the taper surface and a cylindrical body on a lower stage than each of the cylindrical bodies, and an elastic member biasing the stopper so that the stopper abuts on the taper surface.

Moreover, the first lock release portion preferably has a swing member having one end rotatably supported to the lower end portion of the release bar and the other end swinging in conjunction with upward movement of the release bar so as to release the thrust of the first lock portion to an inner wall of the second cylindrical body. The swing member preferably thrusts the stopper to release abutment of the stopper on the taper surface.

An expanding and contracting column according to a third aspect of the present invention includes plural-stage cylindrical bodies, is provided at the lower end portions of inner cylindrical bodies with one or more lock portions locking mutual slide of the cylindrical bodies by a friction force with an adjacent outer cylindrical body, and arranges to be vertically movable within the cylindrical bodies one or more lock release portions corresponding to the lock portions.

Here, the column preferably has a lock release lever provided at the upper end portion of the uppermost cylindrical body, a release bar having an upper end portion rotatably supported to the lock release lever so as to be movable vertically within the cylindrical bodies, and the lock release portions at the lower end portion of the release bar.

Moreover, the lock portion preferably has a slide member fixed at a part thereof to a lower end portion of each of the cylindrical bodies other than the lowermost cylindrical body and having, at least at a part of circumference thereof, a taper surface tilting toward an inner wall of an adjacent outer cylindrical body, a stopper held between the taper surface and a cylindrical body on a lower stage than each of the cylindrical bodies, and an elastic member biasing the stopper so that the stopper abuts on the taper surface.

Moreover, the lock release portion preferably has a swing member having one end rotatably supported to the lower end portion of the release bar and the other end swinging in conjunction with upward movement of the release bar so as to release the thrust of each lock portion to an inner wall of an outer cylindrical body.

Moreover, the swing member preferably thrusts the stopper to release abutment of the stopper on the taper surface.

Moreover, the stopper preferably has a tilted surface to abut on the taper surface.

A handling tool according to the present invention is a handling tool for use in any of the portable screen assembly according to the first to fourth aspects, wherein a grip portion is provided at one end of a shaft, and a release portion is provided at the other end to thrust and release a lock release lever, and the release portion has a movable protrusion located on the shaft line of the shaft to abut on an object to be released, and a pair of fixed protrusions provided on both sides of the movable protrusion and holding the movable protrusion.

According to the present invention, since in a column including plural-stage cylindrical bodies, a plurality of lock portions locking mutual slide of the cylindrical bodies are provided and a plurality of lock release portions corresponding to the lock portions are arranged to be vertically movable within the cylindrical bodies, it is possible to provide a portable screen assembly and an expanding and contracting column enabling easy extension and contraction of a column and enabling the column to be held at a desired height. Moreover, since the column is integrated with a casing and can be erected, the screen assembly can be smaller and easier to carry by laying down the column in storage. When in use, the column has only to be erected and extended to a desired height, and a screen has only to be stretched. When in storage, the column has only to be contracted and laid down, the screen has only to be wound back, and an opening has only to be closed with a top bar. Thus, the screen assembly is easy to handle. Also, since the top bar is also used as a lid of the casing, no lid is needed, which enables weight reduction of the screen assembly.

DETAILED DESCRIPTION OF THE INVENTION

Hereinafter, embodiments of the present invention will be described with reference to the drawings.

First Embodiment

Figure 1:
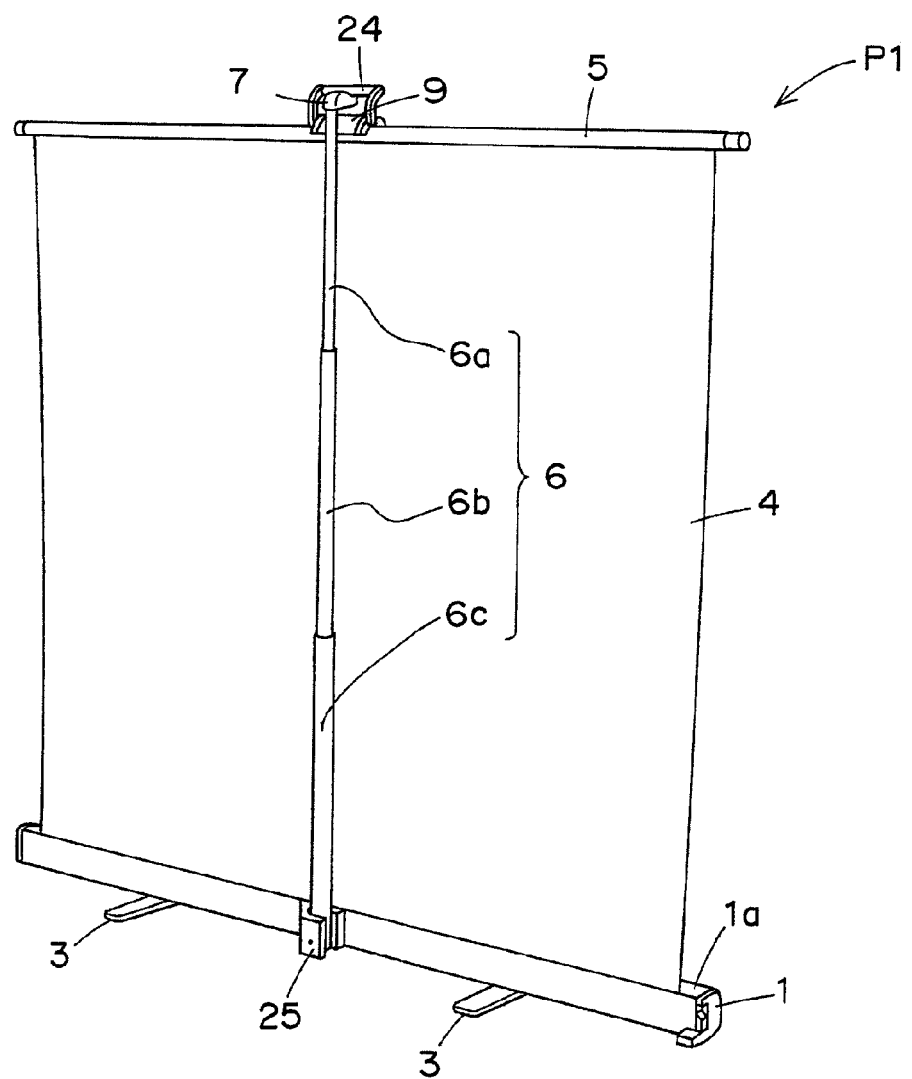
FIG. 1 is a schematic perspective view showing an example of a structure of a portable screen assembly according to the present invention at the time of use.

FIG. 1 shows an example of a portable screen assembly according to the present embodiment during use thereof. A portable screen assembly P1 includes a casing 1, a spring-biased roll (not shown) mounted in the casing, a screen 4 pulled out from an opening 1a and stretched between a top bar 5 and the spring-biased roll, and a column 6 erected approximately at the center of the casing 1 and holding the screen 4 at a predetermined height. The column 6 is constituted by three-stage cylindrical bodies, that is, a first cylindrical body 6a, a second cylindrical body 6b, and a third cylindrical body 6c arrayed from the upper stage side, that are supported by a column mounting member 25 mounted approximately at the center of the casing 1 and that can slidably extend and contract. The column 6 has at its tip end a hook portion 7 that enables horizontal turn and hangs the screen 4 by hooking to the hook portion 7 a handle 24 for carriage provided approximately at the center of the top bar 5 and acting as a hooking member. The reference numeral 9 denotes an engaging portion constituting a lock mechanism locking the top bar 5 to the casing 1 and this engaging portion engages with a portion to be engaged (not shown) provided at the casing 1 during storage thereof. The screen assembly P1 is supported to be erected with a pair of leg portions 3, 3 pulled out from the bottom portion of the casing 1.

Figure 2:
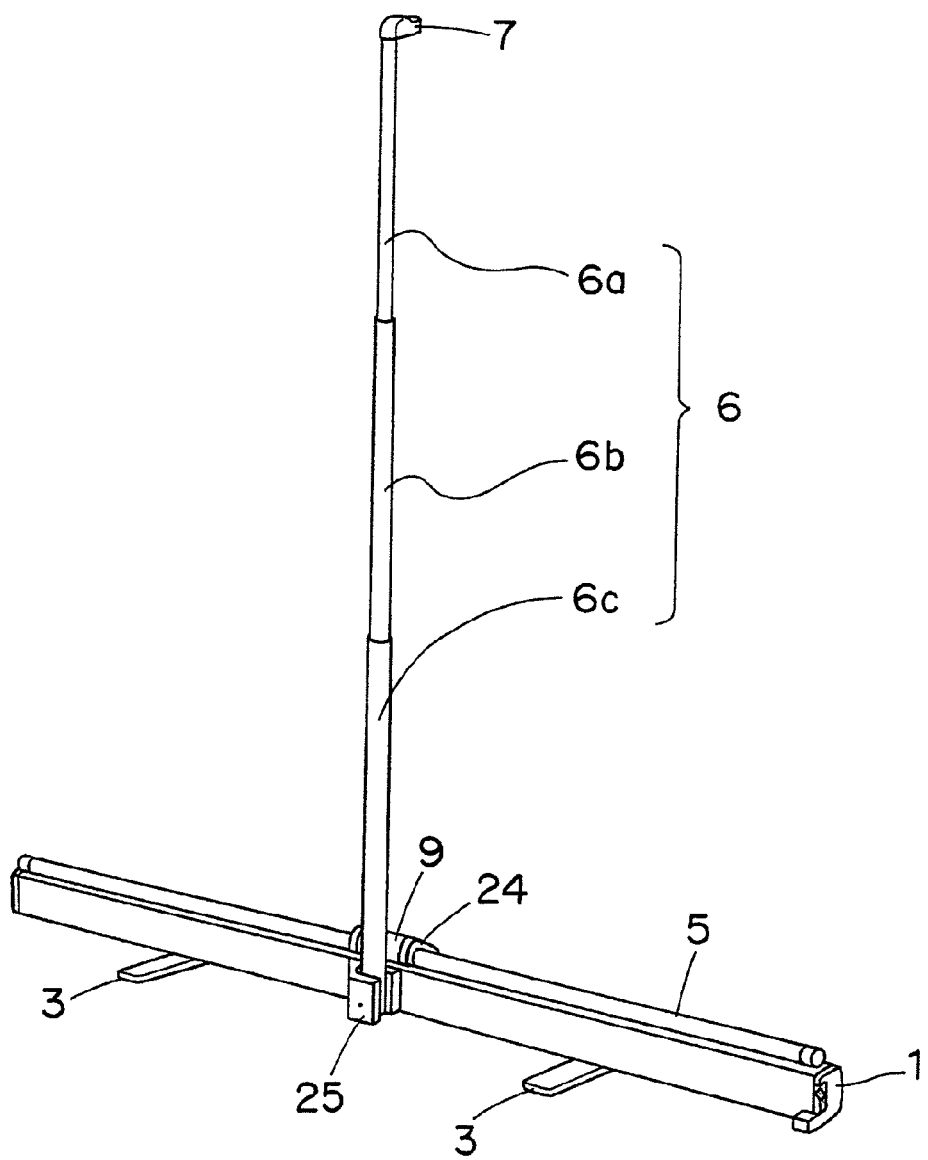
FIG. 2 is a schematic perspective view showing a structure of a screen that has been wound back in the portable screen assembly in FIG. 1.
Figure 3:
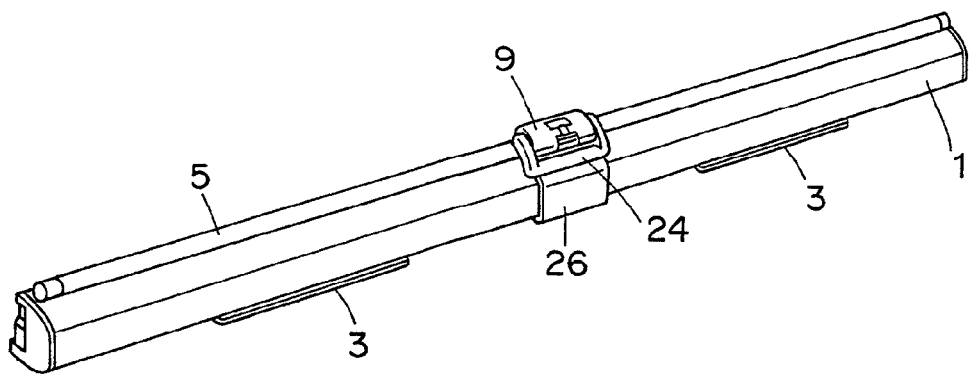
FIG. 3 is a schematic perspective view showing a structure of the portable screen assembly in FIG. 1 at the time of storage.

FIG. 2 shows an example of a structure of the portable screen assembly P1 in a state where the screen 4 is wound back for storage. The screen 4 released from being hooked to the hook portion 7 is wound back and stored in the casing 1. The top bar 5 acts as a lid and closes the opening of the casing 1. FIG. 3 shows an example of a structure of the portable screen assembly P1 when it is stored. The column 6 has its lower end portion pivotally supported by the column attaching member 25, turns around the lower end portion, and is laid down. In this manner, the column 6 is stored in a state where the entire column is parallel to the casing 1. It is to be noted that the reference numeral 26 denotes a protecting member for the casing described below.

Figure 4:
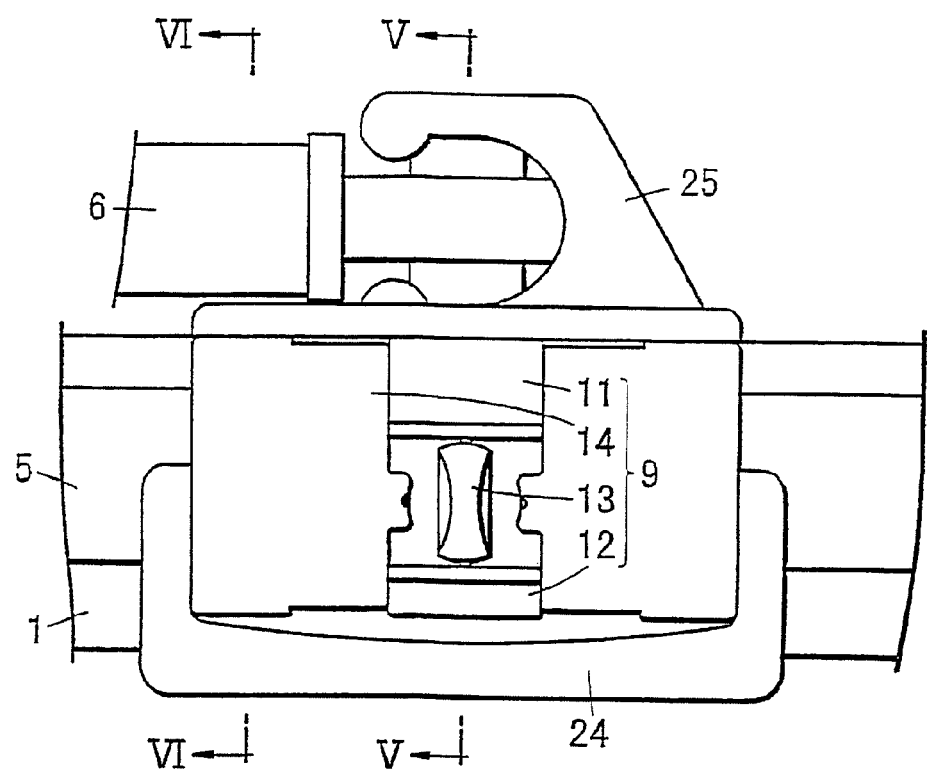
FIG. 4 is an enlarged top view of a lock mechanism in FIG. 3.

FIG. 4 is a schematic partial enlarged view of the center portion of the screen assembly P1 during storage thereof. The lock mechanism has the engaging portion 9 mounting to the upper surface of the top bar 5 and the portion to be engaged (not shown) provided on the casing 1 side and engaged with the engaging portion 9. The engaging portion 9 is provided with a supporting portion 14, a pair of engaging portions 11, 12 arranged on the supporting portion 14 to be opposed to each other so as to approach to and separate from each other in the circumferential direction of the top bar 5, and a handling portion lock mechanism 13 arranged between the pair of engaging members to prevent the engaging members from approaching to each other at the time of engagement.

Figure 5:
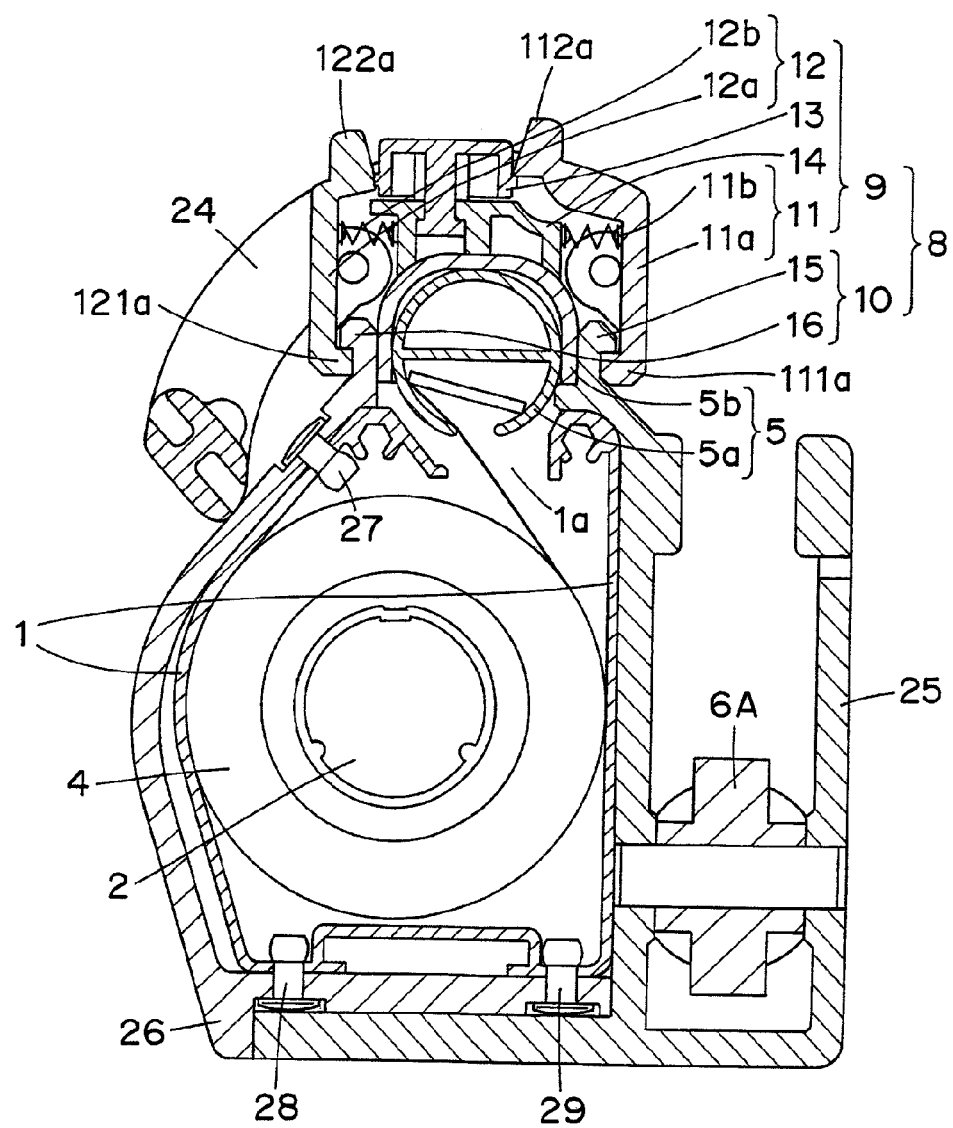
FIG. 5 is a schematic vertical cross-sectional view along line V-V in FIG. 3.

FIG. 5 is a vertical cross-sectional view along line V-V in FIG. 4. The casing 1 has a space portion 1a in which the screen is pulled out and is constituted by a case member extending in the longitudinal direction. The casing 1 has a front side on the projector side formed in a curved structure swelling to the projector side and a rear surface formed in an L-shaped cross-sectional shape. This enables the spring-biased roll 2 around which the screen 4 is wound to be stored in the casing 1 and enables the opening 1a to be small in width for size reduction of the casing 1. For the case member, an aluminum extruded material can be used.

As the casing 1, one made by combining a first case member and a second case member extending in the longitudinal direction can be used. In such a case, it is preferable to combine ends in the width directions of the two case members by a one-side hinge mechanism to be openable and closable and to separate the other ends from each other to form a space portion in which the screen is pulled out. By using the combined first case member and second case member, the case members can be small in thickness without lowering the strength of the casing. This enables weight reduction of the screen assembly.

To the rear side of the casing 1, the column attaching member 25 pivotally supporting the column 6 is mounted. On the other hand, to the center portion on the front side of the casing 1, the protecting member 26 extending to the bottom portion of the casing 1 is attached. Here, one end of the protecting member 26 is fastened on the bottom portion of the casing 1 with rivets 28, 29 while the other end is fastened and fixed with a rivet 27. The column mounting member 25 and the protecting member 26 are fit and fixed to each other. The protecting member 26 is effective in preventing the front side part of the casing from being curved and deformed further to the projector side by the load of the top bar. For the protecting member, a highly-elastic and light-weight resin-made cover is preferably used. It is to be noted that the protecting member 26 is not necessarily mounted to the entire surface at the center portion on the front side but may be attached to cover the upper half or at least the opening edge portion at the center portion on the front side of the casing.

A lock mechanism 8 is constituted by the engaging portion 9 and the portion to be engaged 10. Further, the engaging portion 9 is constituted by a pair of engaging portions including the first engaging portion 11 and the second engaging portion 12. A first engaging member 11a and a second engaging member 12a constituting the first engaging portion 11 and the second engaging portion 12, respectively, are arranged to be opposed in the width direction of the top bar 5 and are rotatably supported on the supporting portion 14 so as to be rotatable within a vertical portion with respect to the longitudinal direction of the top bar. Further, the engaging members 11a, 12a have at their one ends engaging end portions 111a, 121a to be engaged with the portion to be engaged 10 and have at their other ends handling portions 112a, 122a to handle engagement and release of the engaging end portions 111a, 121a, respectively. FIG. 5 shows an example of using engaging nails for the engaging end portions 111a, 121a and using raised knobs for the handling portions 112a, 122a. The top bar 5 is constituted by a supporting bar 5a and a protecting cover 5b.

On the other hand, the portion to be engaged 10 is constituted by a pair of members to be engaged 15, 16. The members to be engaged 15, 16 are provided at the opening edge portion of the casing 1 and are engaged with the aforementioned engaging nails.

Moreover, the first engaging portion 11 and the second engaging portion 12 have a first spring member 11b and a second spring member 12b engaged at one ends with the supporting portion and engaged at the other ends with the engaging members, respectively. These spring members constantly bias the handling portions 112a, 122a at one ends of the engaging members in directions of getting away from each other and thrust the engaging edge portions at the other ends in the top bar directions.

It is to be noted that, although FIG. 5 shows a case where the members to be engaged 15, 16 are integral with the column attaching member 25 and the protecting member 26, respectively, the members to be engaged 15, 16 may be provided separately from the column attaching member 25 and the protecting member 26, respectively. The member to be engaged 15 may be mounted to the front surface side of the casing to cover the opening edge portion of the casing, so that the protecting member may be omitted.

When the lock mechanism is in an engaged state, the engaging end portions 111a, 121a are engaged with the members to be engaged 15, 16, respectively, as shown in FIG. 5. To release the engagement of the engaging end portions with the members to be engaged, the handling portions 112a and 122a are thrust in directions in which they approach to each other against the biasing force of the spring members. In this manner, the engaging members 11a, 12a turn in directions in which the engaging end portions 111a, 121a separate from the members to be engaged 15, 16, and the engagement of the engaging end portions with the members to be engaged is released. On the other hand, to engage the engaging end portions with the members to be engaged, the engaging portion is thrust downward at the time of closing the opening of the casing by the top bar. The engagement is made in a state where the engaging end portions are brought in pressure contact with the members to be engaged by the biasing force of the spring members.

On the upper surface of the supporting portion 14, the lock member 13 constituting the handling portion lock of the spring attached to the spring-biased roll mechanism is provided. The handling portion lock mechanism is a mechanism to prevent erroneous operations of the lock mechanism. For example, when a stored screen assembly is carried, the handling portions may be thrust in directions in which they approach each other when holding the handle, and the top bar may pop out of the casing. By providing the handling portion lock mechanism, release of an engagement state in response to movement of the handling portions can be prevented when the lock mechanism is in the engagement state.

The lock member 13 is inserted in the base portion 14 to be rotatable between the lock position and the release position, and when the lock mechanism is in the engagement state, the lock member 13 is in the lock position shown in FIG. 5. In the lock position, both the end portions of the head portion of the lock member 13 abut on the handling portions 112a, 122a, respectively, to prevent the handling portions from approaching to each other. On the other hand, in the release position, the lock member turns so as to release abutment of both the end portions on the respective handling portions, and the handling portions can approach to each other. Thus, in the release position, the lock mechanism is released, fixing of the top bar to the casing is released, and the screen can be pulled out.

Figure 6:
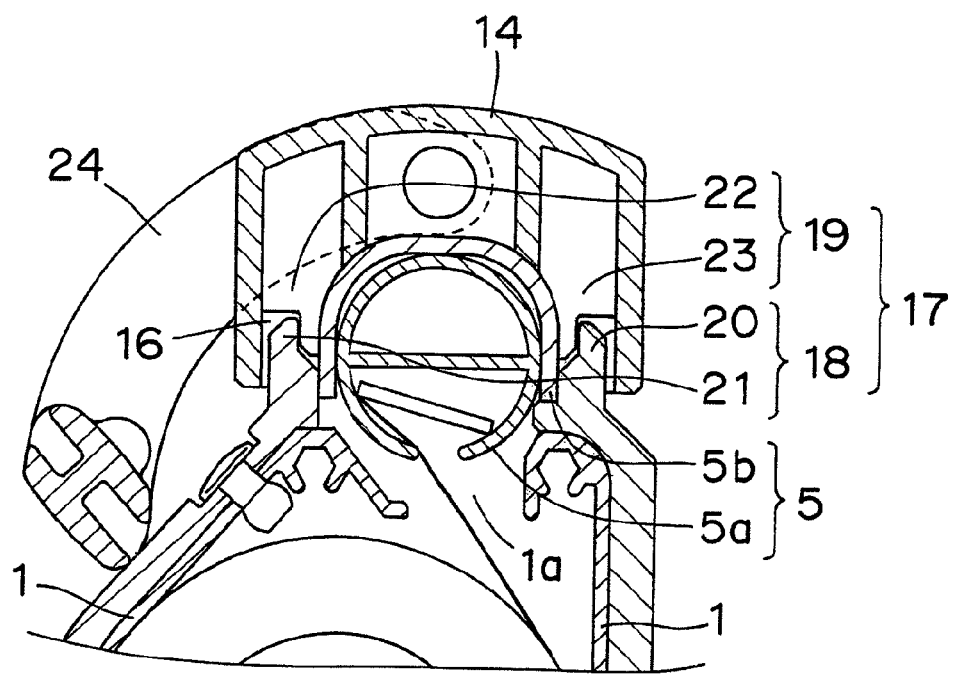
FIG. 6 is a schematic vertical cross-sectional view along line VI-VI in FIG. 3.

FIG. 6 is a vertical cross-sectional view along line VI-VI in FIG. 4 and shows a structure of a positioning mechanism 17 for accurate positioning between the engaging portion and the portion to be engaged of the lock mechanism. The positioning mechanism 17 is constituted by a guide portion 18 formed in the opening edge portion of the casing to be in alignment with the portion to be engaged and a portion to be guided 19 formed in the base portion 14 of the lock mechanism and loosely inserted in the guide portion 18 and vice versa. The guide portion 18 is constituted by a pair of protruded edge portions 20, 21 provided at the opposed opening edge portions of the casing. Each protruded edge portion may be constituted by at least one protruded portion, but it is preferable to arrange two or more protruded portions on both sides of each member to be engaged. On the other hand, the portion to be guided 19 is constituted by guide recesses 22, 23 formed on the front side and the rear side of the supporting portion 14.

When the opening of the casing is to be closed by the top bar, the portion to be guided is loosely inserted in the guide portion to position and lock the top bar to the opening. Since this prevents the engagement position between the engaging portion and the portion to be engaged from being displaced, the top bar can be locked easily. Although the present embodiment shows an example of using guide recesses for the portion to be guided and using protruded edge portions for the guide portion, protruded edge portions may be used for the portion to be guided while guide recesses may be used for the guide portion.

Figure 7:
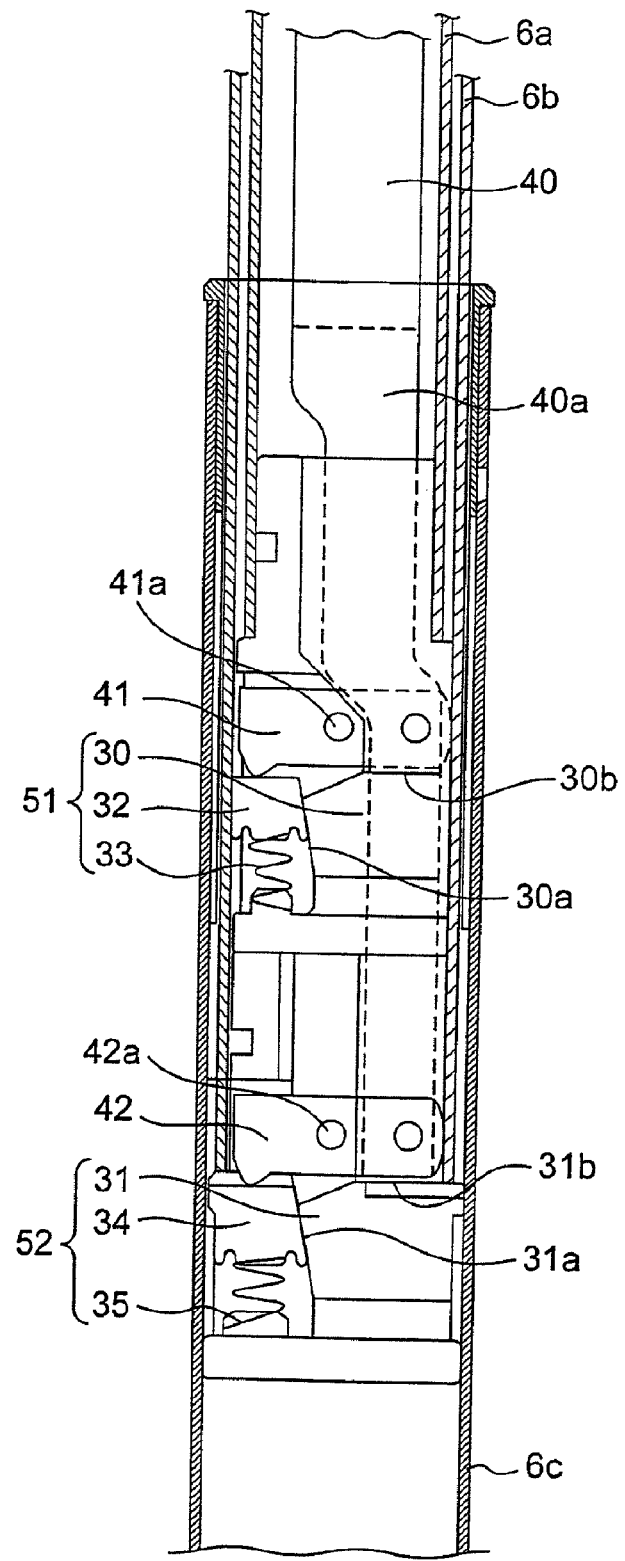
FIG. 7 is a schematic cross-sectional view showing an example of a structure of a column used in the portable screen assembly according to the present invention when the column is contracted.

FIG. 7 is a schematic cross-sectional view showing an example of the expanding and contracting column used in the portable screen assembly of the present invention and shows a state where, the column including three-stage cylindrical bodies mutually sliding and slidably expanding and contracting, and the first cylindrical body and the second cylindrical body are contracted to make the column shortest.

The column has a first lock portion and a second lock portion provided at the lower end portions of the first cylindrical body 6a and the second cylindrical body 6b, respectively, and locking mutual slide of the cylindrical bodies by a friction force with an adjacent outer cylindrical body. The first lock portion 51 has a slide member 30 having, at least at a part of circumference thereof, a taper surface 30a tilting toward an inner wall of the adjacent outer cylindrical body (second cylindrical body), a stopper 32 held between the taper surface 30a and the second cylindrical body, and an elastic member 33 biasing the stopper 32 so that the stopper 32 may abut on the taper surface 30a. Here, a part of the slide member 30 is fixed at the lower end portion of the first cylindrical body 6a.

For the elastic member 33, a spring member can be used. One end of the spring member is engaged with the slide member 30 while the other end is engaged with one end of the stopper 32.

The second lock portion 52 has a slide member 31 having, at least at a part of circumference thereof, a taper surface 31a tilting toward an inner wall of the adjacent outer cylindrical body (third cylindrical body), a stopper 34 held between the taper surface 31a and the third cylindrical body, and an elastic member 35 biasing the stopper 34 so that the stopper 34 may abut on the taper surface 31a. Here, a part of the slide member 31 is fixed at the lower end portion of the second cylindrical body 6b. For the elastic member 35, a spring member can be used. One end of the spring member is engaged with the slide member 31 while the other end is engaged with one end of the stopper 34. In order to bring the stopper in contact with the taper surface of the slide member reliably in the locked state, it is preferable to provide a swelling curved surface on the circumference or preferably the upper half of the circumference of the stopper.

In the first cylindrical body 6a, there is arranged a release bar 40 having an upper end portion rotatably supported to a below-described lock release lever to be vertically movable within the first cylindrical body. At a lower end portion 40a of the release bar 40, a first lock release portion 41 releasing the corresponding first lock portion 51 and a second lock release portion 42 releasing the corresponding second lock portion 52 are arranged.

The first lock release portion 41 is constituted by a swing member 41 having one end rotatably supported to the lower end portion 40a of the release bar 40 and the other end swinging in conjunction with upward movement of the release bar 40. The second lock release portion 42 is constituted by a swing member 42 having one end rotatably supported to the lower end portion 40a of the release bar 40 to be away from the first lock release portion 41 by a predetermined distance in the downward direction and the other end swinging.

In the state shown in FIG. 7, the first lock portion 51 and the second lock portion 52 are in a working state (a lock state), and the first cylindrical body 6a and the second cylindrical body 6b are fixed. That is, the stopper 32 of the first lock portion 51 is biased upward by the elastic member 33, abuts on the taper surface 30a and the inner wall of the second cylindrical body 6b to generate a friction force, and fixes the first cylindrical body 6a. The stopper 34 of the second lock portion 52 is biased upward by the elastic member 35, abuts on the taper surface 31a and the inner wall of the third cylindrical body 6c to generate a friction force, and fixes the second cylindrical body 6b. On the other hand, the swing member 41 is in a horizontal state. Its rotatably-supported one end portion abuts on a flat portion 30b of the slide member 30 while its other end portion does not thrust the stopper 32 and is in a state of getting away from or merely in contact with the stopper. The same applies to the swing member 42, in which case the other end portion thereof does not thrust the stopper 34.

Figure 8:
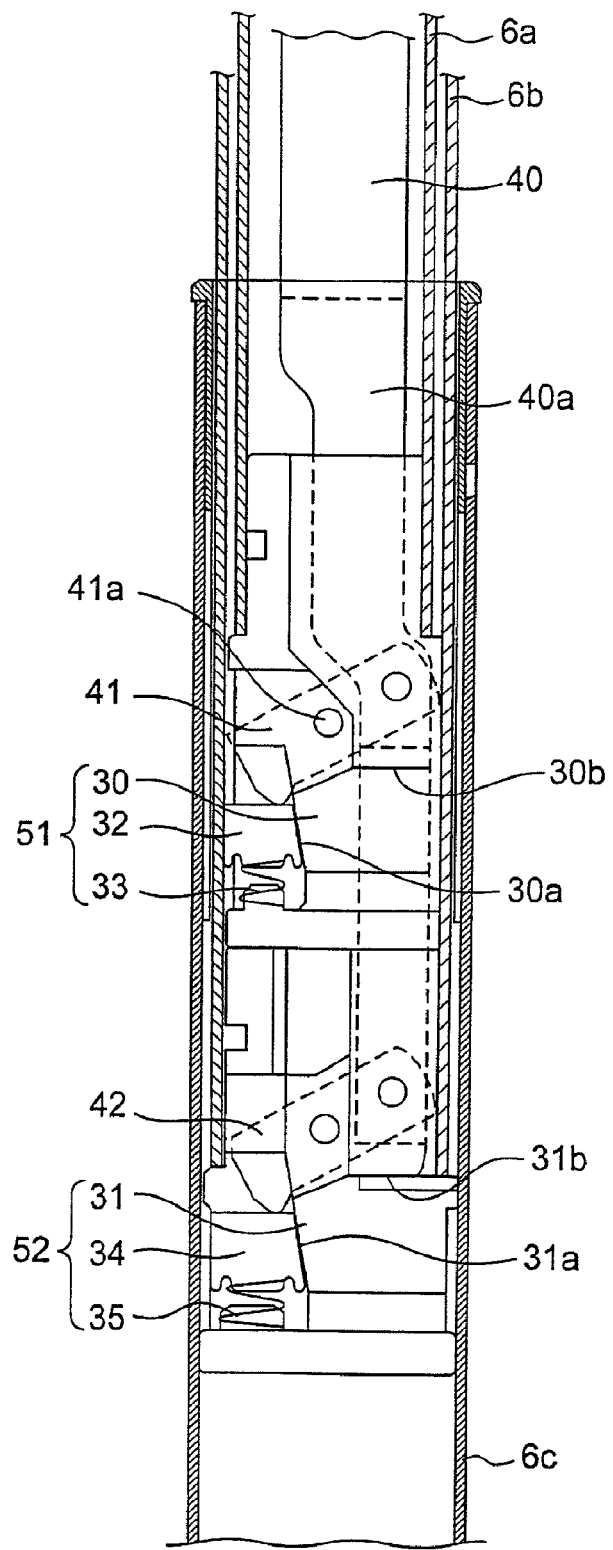
FIG. 8 is a schematic cross-sectional view showing an example of a structure of the column used in the portable screen assembly according to the present invention when the column is extended.

On the contrary, when a below-described lock release lever connected to the release bar 40 is thrust and operated as shown in FIG. 8, the release bar 40 moves upward within the first cylindrical body, and interlocking therewith, the swing member 41 swings, and the other end portion thrusts the stopper 32. In this manner, the stopper 32 is thrust downward, as a result of which abutment of the stopper 32 on the inner wall of the second cylindrical body and the taper surface 30a is released, and the friction force is lowered, thus the lock state of the first lock portion 51 is released. The same applies to the swing member 42, in which case the swing member 42 swings, and the stopper 34 is thrust downward. As a result, the lock state of the second lock portion 52 is released. Here, fulcrum shafts 41a and 42a are provided approximately at the centers on the respective side surfaces of the swing member 41 and the swing member 42, and the fulcrum shafts 41a and 42a are respectively supported by bearing recesses (not shown) provided on the inner surfaces of the slide members 30 and 31. The fulcrum shafts act as fulcrums for leverage operations at the time of swing to enable the swing members to thrust the stoppers more strongly.

Figure 9:
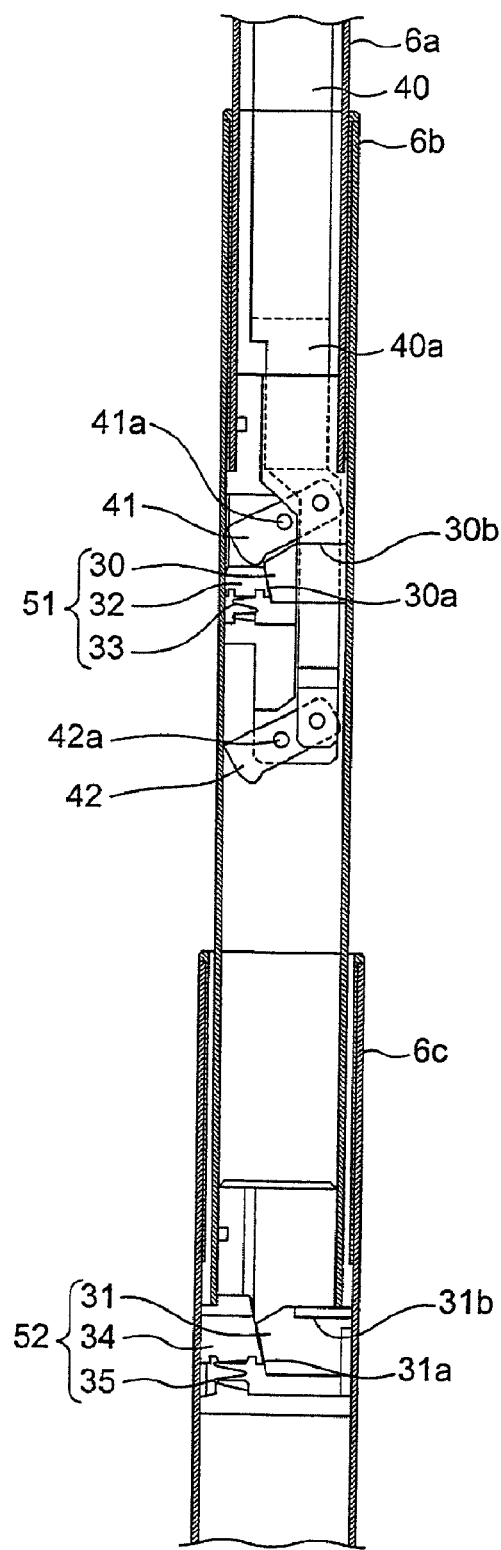
FIG. 9 is a schematic cross-sectional view showing another example of a structure of the column used in the portable screen assembly according to the present invention when the column is extended.

Moreover, when the second cylindrical body is pulled up to lock the second lock portion, as shown in FIG. 9, only the first cylindrical body can be extended.

The shape of each stopper is not particularly limited as long as the stopper can be held between the slide member and the inner wall of the cylindrical body, but the stopper preferably has a tilted surface that can abut on the taper surface of the slide member. For example, it is preferable to use a stopper having a trapezoidal vertical cross-sectional shape.

Figure 10:
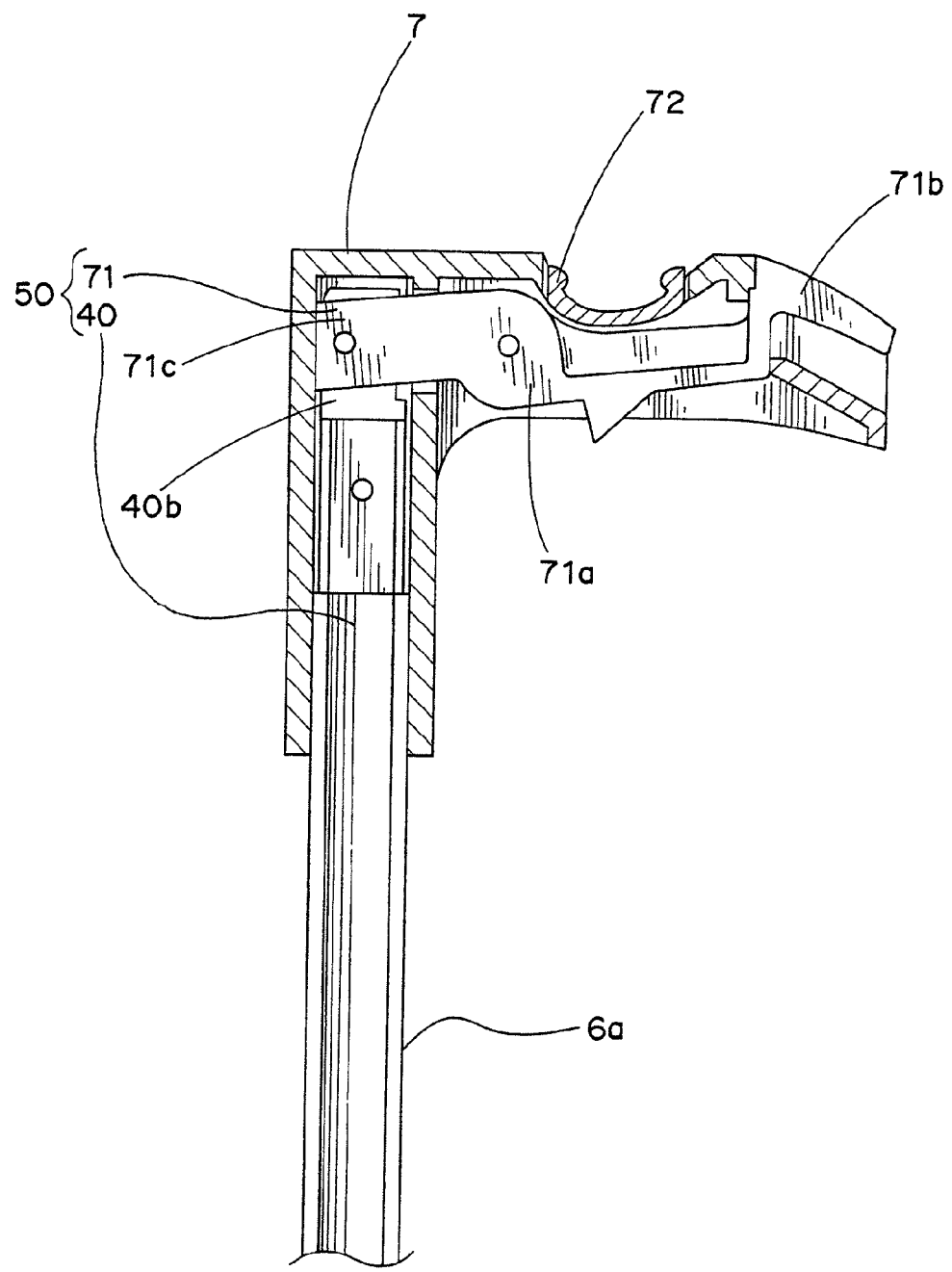
FIG. 10 is a schematic cross-sectional view showing an example of a structure of a hook portion used in the portable screen assembly according to the present invention.

FIG. 10 is a schematic cross-sectional view showing a structure of the hook portion 7 attached to the tip end portion of the first cylindrical body 6a. The hook portion 7 has, in its inside, a hooking portion 72 that hooks the top bar on the surface and a lock release lever 71. The lock release lever 71 is supported so that one end and the other end can swing vertically with a shaft fastening portion 71a acting as a fulcrum. Here, one end of the lock release lever 71 is arranged on the front side of the hook to constitute a handling portion 71b while the other end is connected to an upper end portion 40b of the release bar 40 to constitute a connecting portion 71c. The shaft fastening portion 71a is provided with a spring member (not shown) biasing the handling portion 71b upward. The release bar 40 having the lock release portions and the lock release lever 71 constitute a lock release mechanism 50.

When the handling portion 71b of the lock release lever 71 is thrust, the connecting portion 71c moves upward by leverage operations in which the shaft fastening portion 71a acts as a fulcrum. In conjunction with the movement of the connecting portion, the release bar 40 moves upward. Consequently, the lock states of the first lock portion and the second lock portion are released as described above, and the first cylindrical body and the second cylindrical body can be pulled out of the third cylindrical body freely.

Operations of the portable screen assembly according to the present embodiment will be described below.

When the assembly is not used, the column is laid down and is stored in the casing to be roughly parallel to the casing as shown in FIG. 3. The top bar is locked to the casing as a lid of the casing, and the assembly is extremely easy to store and carry. Also, the hook portion at the tip end of the column is rotatably supported on the column.

When the assembly is to be used, the column is erected as shown in FIG. 2. When the handling portion of the lock release lever arranged on the front surface of the hook portion is thrust, the lock states of the first lock portion and the second lock portion are released as shown in FIG. 8. Thus, when the hook portion is pulled up while the handling portion is thrust, the first cylindrical body and the second cylindrical body can be pulled out of the third cylindrical body. When the thrust of the handling portion of the lock release lever is ceased after the first cylindrical body and the second cylindrical body have been pulled up to desired heights, the release bar moves downward, the swing members are in horizontal states, and the thrusts toward the stoppers are released. As a result, the first lock portion and the second lock portion are in lock states, and the first cylindrical body and the second cylindrical body are fixed. Fine adjustment of the column height is available by pulling up or pushing down the hook portion in a state where the handling portion is thrust.

After the column is adjusted to a desired height, the handling portion lock mechanism of the lock mechanism is released, and the handling portions are thrust in directions in which they approach to each other, to release locking of the top bar to the casing. Subsequently, when the top bar is pulled upward, the screen is pulled out from the spring-biased roll against the elastic force of the spring attached to the spring-biased roll and the gravitational force of the screen. Subsequently, the handle provided on the top bar is hooked to the hook portion of the column to keep the screen in a stretched state.

For storage, the handle is removed from the hook portion, and the top bar is lowered and put on the opening in a state where the handle is being held. At this time, the guide portion of the positioning mechanism first comes into contact with the portion to be guided, and when the top bar is lowered in this state, the guide portion is loosely inserted in the portion to be guided. In this state, positioning between the engaging portion and the portion to be engaged of the lock mechanism is performed. Subsequently, when the top bar is thrust downward, the lock mechanism is operated, and the top bar is locked to the casing.

Further, when the hook portion is pushed down in a state where the handling portion of the lock release lever is thrust, the lock state of only the first lock portion is released, and the first cylindrical body can be pushed into the second cylindrical body. When the hook portion is further pushed down in a state where the handling portion of the lock release lever is thrust, the lock state of the second lock portion is released, and the second cylindrical body can be pushed into the third cylindrical body. When the thrust of the handling portion is ceased, the second lock portion is also in a lock state as shown in FIG. 8. In a state where the column is shortest, the column is laid down and is stored in the casing to be parallel to the casing.

According to the present embodiment, in the column including three or more cylindrical bodies, there are provided plural lock portions that lock mutual slide of the cylindrical bodies by a friction force of a cylindrical body with an adjacent outer cylindrical body, and the corresponding plural lock release portions are arranged to be vertically movable within the cylindrical bodies. Accordingly, the height of the column can be adjusted to any height unlimitedly.

Moreover, since easy handling of pulling up the hook portion in a state of handling the lock release lever enables the column to extend from the shortest state to the longest state or extend to a required height at once or enables the column to contract from the longest state or the required height to the shortest state at once, extension handling and contraction handling of the column are extremely easy.

Further, since the handling portion of the lock release lever is provided on the front surface side of the hook portion, the column height can be adjusted on the front side of the screen. Thus, since it is not necessary to go behind the screen to adjust the column height as in a conventional case, the column height can be easily adjusted even in a small space.

Further, conventionally, since a method for engaging and fixing cylindrical bodies that mutually slide with and to one another is adopted for adjustment of the height of a column, hole drilling process to open through holes for engagement in the cylindrical bodies has been necessary. In the present invention, the through holes for engagement are not necessary, and thus a lower-cost screen assembly can be provided.

Although an example of using a column including three-stage cylindrical bodies has been shown in the present embodiment, the number of stages is not particularly limited as long as it is two or more. For example, in a case of using four-stage cylindrical bodies, a third lock portion can be provided at the lower end portion of the third cylindrical body, and in correspondence with the third lock portion, a third lock release portion can be provided at the lower end portion of the release bar. In this manner, in a case of using three-stage or more cylindrical bodies, a lock portion can be provided at the lower end portion of every cylindrical body located on higher stages than the cylindrical body on the lowermost stage, and a lock release portion corresponding to the lock portion can be provided at the release bar.

In the present embodiment, an example has been shown in which a mechanism of thrusting an inner wall of an outer cylindrical body to lock the slide of a cylindrical body by a friction force with the inner wall is used for the lock portion, and in which a mechanism of releasing the lock portion by releasing the thrust toward the inner wall of the cylindrical body is used for the lock release portion. However, a lock portion and a lock release portion according to the following aspect may be used instead of the lock portion and the lock release portion.

That is, a portable screen assembly according to another aspect of the present invention can use a column for stretching a screen wherein the first lock portion has a first catching portion constituted by a plurality of through holes provided in the longitudinal direction of the second cylindrical body and a first engaging portion provided at the lower end portion of the first cylindrical body and engageable with the first catching portion, wherein the second lock portion has a second catching portion constituted by a plurality of through holes provided in the longitudinal direction of the third cylindrical body and a second engaging portion provided at the lower end portion of the second cylindrical body and engageable with the second catching portion, and wherein a first lock release portion that releases engagement of the first engaging portion with the first catching portion is provided at the lower end portion of the release bar, and a second lock release portion that releases engagement of the second engaging portion with the second catching portion is provided under the first lock release portion. A mechanism of the lock release is not particularly limited as long as it can release the engagement with the through holes. For example, for the engaging portion, there can be used a protruded member biased at all times by an elastic member so as to be engaged with the catching portion constituted by the through holes so that the engaging portion may be thrust when the engagement is to be released. Alternatively, the engaging portion to be engaged with the catching portion may be provided on one end of the lock release portion, and the lock release portion may swing to release the engagement.

Figure 11:
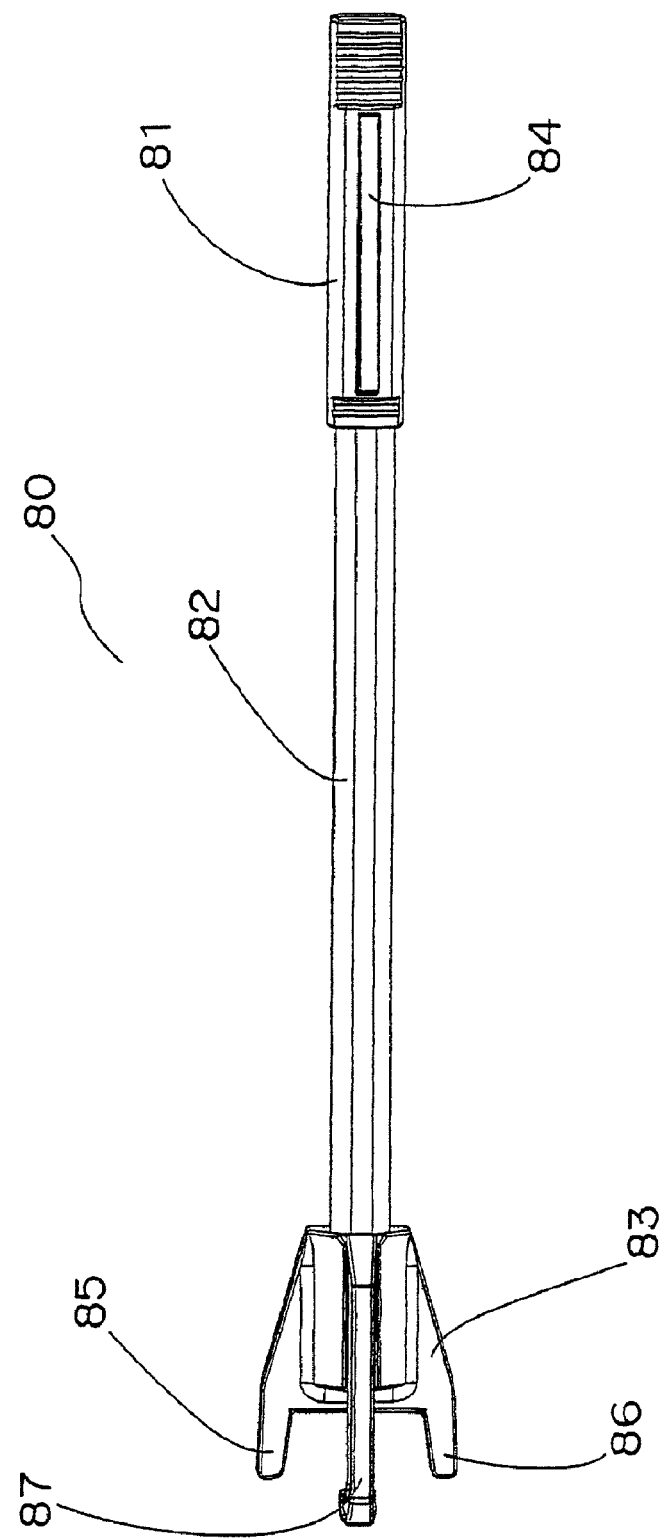
FIG. 11 is a top view showing an example of a structure of a handling tool used in the portable screen assembly according to the present invention.
Figure 12:
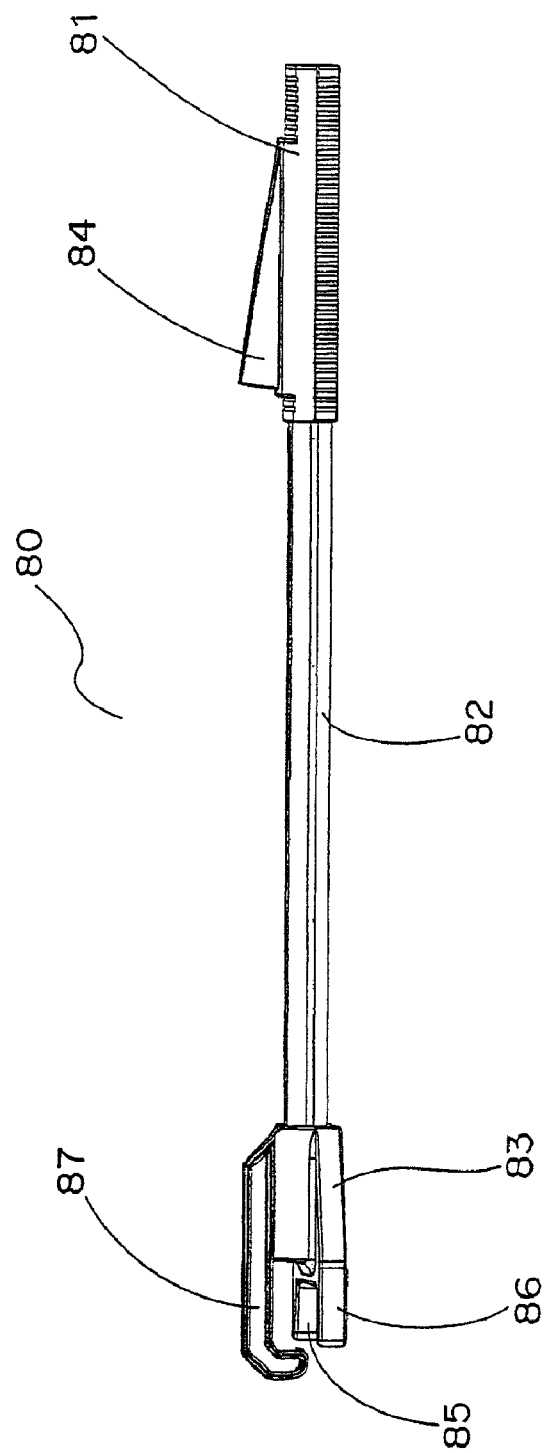
FIG. 12 is a side view showing an example of a structure of the handling tool used in the portable screen assembly according to the present invention.

Recently, there is a trend toward increase in screen size. In the present invention, the column can be heightened to use a large-sized screen such as a 100-inch screen. In this case, it is preferable to use a handling tool that enables a person to handle the lock release lever from a distance. FIGS. 11 and 12 are a top view and a perspective view, respectively, showing an example of the handling tool. A handling tool 80 is provided with a grip portion 81 on one end of a hollow shaft 82 and a release portion 83 on the other end to thrust and release the lock release lever. The release portion 83 has a movable protrusion 87 located on the shaft line of the shaft 82 to abut on an object to be released and a pair of fixed protrusions 85, 86 provided on both sides of the movable protrusion 87 and holding the movable protrusion 87. The movable protrusion 87 is connected to a handling portion 84 provided at the grip 81 via a connecting member (not shown) passing through the shaft 82. When the handling portion 84 is pressed, it can make the movable protrusion 87 slide onto the shaft line of the shaft 82 to the grip side.

For example, the handling tool can be used as follows. When the column is in a low state, the top bar is hooked to the hook portion, and the release portion of the handling tool is thrust to the front surface of the hook portion so that the movable protrusion may abut on the lock release lever. Here, the fixed protrusions act as holding portions to let the movable protrusion abut on the lock release lever. When the handling portion is pressed, the movable protrusion is thrust to the lock release lever, thus to release the lock. When the hook portion is pushed up in this state, the column can be extended. At the time of storing the screen, the hook is lowered in reverse, and the column can be shortened. Accordingly, by using the handling tool of the present invention, the screen can be stretched and stored easily by simple handling even in a large-sized screen assembly.

As described above, the present invention can provide a portable screen assembly that is light and easy to handle and enables easy extension and contraction of a column. Although an example of using an expanding and contracting column of the present invention for a column of a portable screen assembly has been shown in the present embodiment, the column can be used widely for any expanding and contracting columns that need to be handled easily since the height (or length) of the column can be adjusted to a desired height (or length) by simple handling.

What is claimed is:

1. A portable screen assembly comprising:
   a casing having an opening extending in a longitudinal direction;
   a spring-biased roll rotatably mounted to the casing;
   a screen wound around the spring-biased roll when in storage and pulled out from the opening when in use;
   a top bar secured to one end of the screen and used also as a cover to close the opening when in storage; and
   an column having one end supported at the casing and holding the pulled out screen in a stretched state,
   wherein the column expands and contracts and has at least a first cylindrical body, a second cylindrical body, and a third cylindrical body, wherein the first cylindrical body slides within the second cylindrical body, the second cylindrical body slides within the third cylindrical body, and the cylindrical bodies are arranged in an order of the first cylindrical body, the second cylindrical body and the third cylindrical body from top to bottom in an expanded state of the column,
   wherein the column comprises:
      a first lock portion which locks the sliding of the first cylindrical body;
      a second lock portion which locks the sliding of the second cylindrical body;
      a lock release lever provided at an upper end portion of the first cylindrical body;
      a release bar having an upper end portion pivotally connected to the lock release lever so as to be movable vertically within the first cylindrical body;
      a first lock release portion provided at a lower end portion of the release bar and releasing the first lock portion; and
      a second lock release portion provided below the first lock release portion at the lower end portion of the release bar and releasing the second lock portion,
   wherein the first lock portion is provided at a lower end portion of the first cylindrical body and thrusts an inner wall of the second cylindrical body to lock the slide of the first cylindrical body by a friction force with the inner wall,
   wherein the second lock portion is provided at a lower end portion of the second cylindrical body and thrusts an inner wall of the third cylindrical body to lock the slide of the second cylindrical body by a friction force with the inner wall,
   wherein the first lock release portion releases the first lock portion by releasing the thrust of the first lock portion toward the inner wall of the second cylindrical body,
   wherein the second lock release portion releases the second lock portion by releasing the thrust of the second lock portion toward the inner wall of the third cylindrical body,
   wherein the first lock portion comprises:
      a slide member fixed at a part thereof to the lower end portion of the first cylindrical body and having, at least at a part of circumference thereof, a taper surface tilting toward an inner wall of an adjacent outer cylindrical body;
      a stopper held between the taper surface and a cylindrical body on a lower stage than each of the cylindrical bodies; and
      an elastic member biasing the stopper so that the stopper abuts on the taper surface,
   wherein the second lock portion comprises:
      a slide member fixed at a part thereof to the lower end portion of the second cylindrical body and having, at least at a part of circumference thereof, a taper surface tilting toward an inner wall of an adjacent outer cylindrical body;
      a stopper held between the taper surface and a cylindrical body on a lower stage than each of the cylindrical bodies; and
      an elastic member biasing the stopper so that the stopper abuts on the taper surface, and
   wherein the stopper has a tilted surface to abut on the taper surface.

2. The assembly according to claim 1, wherein
   the first lock portion has a first catching portion constituted by a plurality of through holes provided in a longitudinal direction of the second cylindrical body, and a first engaging portion provided at the lower end portion of the first cylindrical body and engageable with the first catching portion,
   the second lock portion has a second catching portion constituted by a plurality of through holes provided in a longitudinal direction of the third cylindrical body and a second engaging portion provided at the lower end portion of the second cylindrical body and engageable with the second catching portion, and
   the first lock release portion releases engagement of the first engaging portion with the first catching portion, and the second lock release portion releases engagement of the second engaging portion with the second catching portion.

3. The assembly according to claim 1, wherein a handle portion is provided at a center portion of the top bar and a hook portion is provided at a tip end portion of the column, and the handle portion is hooked to the hook portion.

4. The assembly according to claim 3, wherein at the hook portion is provided the lock release lever that is connected to the release bar having a handling portion located on a front surface side of the hook portion, and the release bar moves upward, in conjunction with a thrust operation to the handling portion of the lock release lever.

5. The assembly according to claim 1, wherein the column is pivotally supported to a center portion on a side surface of the casing so that one end can be erected and holds the pulled out screen in a stretched state when erected.

6. The assembly according to claim 1, comprising a lock mechanism that locks the top bar to the casing in storage.

7. The assembly according to claim 6, wherein the lock mechanism has an engaging portion provided on the top bar and a portion to be engaged provided at the casing and engaged with the engaging portion.

8. The assembly according to claim 7, wherein the engaging portion has a pair of engaging members provided to be opposed in a width direction of the top bar, and the portion to be engaged has a pair of members to be engaged respectively provided at opposed opening edge portions of the casing and engaged with the engaging members.

9. An column comprising:
a first cylindrical body;
a second cylindrical body; and
a third cylindrical body,
wherein the first cylindrical body slides within the second cylindrical body, the second cylindrical body slides within the third cylindrical body, and the cylindrical bodies are located in an order of the first cylindrical body, the second cylindrical body and the third cylindrical body from top to bottom in an expanded state of the column,
wherein the column expands and contracts and further comprises:
a first lock portion which locks the sliding of the first cylindrical body;
a second lock portion which locks the sliding of the second cylindrical body;
a lock release lever provided at an upper end portion of the first cylindrical body;
a release bar having an upper end portion pivotally connected to the lock release lever so as to be movable vertically within the first cylindrical body;
a first lock release portion provided at a lower end portion of the release bar and releasing the first lock portion; and
a second lock release portion provided below the first lock release portion at the lower end portion of the release bar and releasing the second lock portion,
wherein the first lock portion is provided at a lower end portion of the first cylindrical body and thrusts an inner wall of the second cylindrical body to lock the slide of the first cylindrical body by a friction force with the inner wall,
wherein the second lock portion is provided at a lower end portion of the second cylindrical body and thrusts an inner wall of the third cylindrical body to lock the slide of the second cylindrical body by a friction force with the inner wall, wherein the first lock release portion releases the first lock portion by releasing the thrust of the first lock portion toward the inner wall of the second cylindrical body, wherein the second lock release portion releases the second lock portion by releasing the thrust of the second lock portion toward the inner wall of the third cylindrical body, wherein the first lock portion comprises:
a slide member fixed at a part thereof to the lower end portion of the first cylindrical body and having, at least at a part of circumference thereof, a taper surface tilting toward an inner wall of an adjacent outer cylindrical body;
a stopper held between the taper surface and a cylindrical body on a lower stage than each of the cylindrical bodies; and
an elastic member biasing the stopper so that the stopper abuts on the taper surface, wherein the second lock portion comprises:
a slide member fixed at a part thereof to the lower end portion of the second cylindrical body and having, at least at a part of circumference thereof, a taper surface tilting toward an inner wall of an adjacent outer cylindrical body;
a stopper held between the taper surface and a cylindrical body on a lower stage than each of the cylindrical bodies; and
an elastic member biasing the stopper so that the stopper abuts on the taper surface, and wherein the stopper has a tilted surface to abut on the taper surface.

10. The column according to claim 9, wherein the first lock portion has a first catching portion constituted by a plurality of through holes provided in a longitudinal direction of the second cylindrical body, and a first engaging portion provided at the lower end portion of the first cylindrical body and engageable with the first catching portion,
the second lock portion has a second catching portion constituted by a plurality of through holes provided in a longitudinal direction of the third cylindrical body and a second engaging portion provided at the lower end portion of the second cylindrical body and engageable with the second catching portion, and
the first lock release portion releases engagement of the first engaging portion with the first catching portion, and the second lock release portion releases engagement of the second engaging portion with the second catching portion.

11. The column according to claim 9, further comprising at least a fourth cylindrical body lower in the column than the third cylindrical body, and
wherein, in each of the cylindrical bodies on a lower stage than the third cylindrical body, a lock portion is provided at a lower end portion of the cylindrical body on a higher stage and a lock release portion corresponding to the lock portion is provided at the release bar.

* * * * *